United States Patent [19]

Korda

[11] E Re. 31,166

[45] Reissued Mar. 1, 1983

[54] RECOVERY OF NORMALLY ILLEGIBLE, MAGNETICALLY RECORDED INFORMATION

[75] Inventor: Peter B. Korda, Los Angeles, Calif.

[73] Assignee: RCA Corporation, New York, N.Y.

[21] Appl. No.: 91,879

[22] Filed: Nov. 7, 1979

Related U.S. Patent Documents

Reissue of:

[64] Patent No.: 3,869,721
Issued: Mar. 4, 1975
Appl. No.: 403,899
Filed: Oct. 5, 1973

U.S. Applications:

[63] Continuation of Ser. No. 659,366, Aug. 9, 1967, abandoned.

[51] Int. Cl.[3] ..... G11B 5/09; G11B 21/10

[52] U.S. Cl. ..... 360/53; 360/77

[58] Field of Search ..... 360/53, 77, 31

[56] References Cited

U.S. PATENT DOCUMENTS

| | | | |
|---|---|---|---|
| 2,975,407 | 3/1961 | O'Brien | 360/31 |
| 3,293,627 | 12/1966 | Auyang et al. | 360/77 |
| 3,350,503 | 10/1967 | Gregg | 178/6.6 |

*Primary Examiner*—Vincent P. Canney
*Attorney, Agent, or Firm*—H. Christoffersen

[57] ABSTRACT

Illegible information recorded along a track of a magnetic record medium is recovered by relatively moving the read head from its normal position at the approximate center of the track to a new position at an edge of the track and then creating relative movement between the head and record medium in the track direction.

4 Claims, 4 Drawing Figures

RECOVERY OF NORMALLY ILLEGIBLE, MAGNETICALLY RECORDED INFORMATION

Matter enclosed in heavy brackets [ ] appears in the original patent but forms no part of this reissue specification; matter printed in italics indicates the additions made by reissue.

This is a continuation of my copending application Ser. No. 659,366, filed Aug. 9, 1967 now abandoned.

BACKGROUND OF THE INVENTION

In a high density digital magnetic recording on a magnetic medium such as a magnetic tape, a magnetic card, a disc, a drum, or the like, there are generally a number of tracks which are relatively narrow and which are relatively closely spaced to one another. If the magnetic medium becomes damaged after the information is recorded as, for example, by dirt particles, by abrasion, or by other means, portions of the recorded information may be sufficiently obliterated that they cannot be read. An example of damage caused in these ways has been found to be scratches which extend at an angle to the track direction and which may obliterate or otherwise make illegible one or more of the recorded binary digits (bits) along the track.

The object of this invention is to provide, in a magnetic recording system, a means for recovering a large fraction of the otherwise illegible recorded information discussed above.

SUMMARY OF THE INVENTION

Magnetically stored information may be recorded by a relatively wide write head and read by a relatively narrow read head which is positioned at the approximate center of the record track. In accordance with the invention, upon the discovery of an error in the information being read by the read head as, for example, by checking the parity of this invention, relative movement though a small distance in a direction transverse to the track direction is imparted between the read head and track until the read head is positioned close to one edge of the track. Then, the track is read again during relative movement between the head and the record medium in the track direction. If this does not result in the recovery of the illegible magnetically recorded information, relative movement again is imparted between the read head and track until the read head is positioned at the other edge portion of the record track and another try made at recovery. It is found, in practice, that this technique results in the recovery of more than 90 percent of otherwise illegible magnetically recorded information.

DETAILED DESCRIPTION

Figures 1, 2, 3, 4:
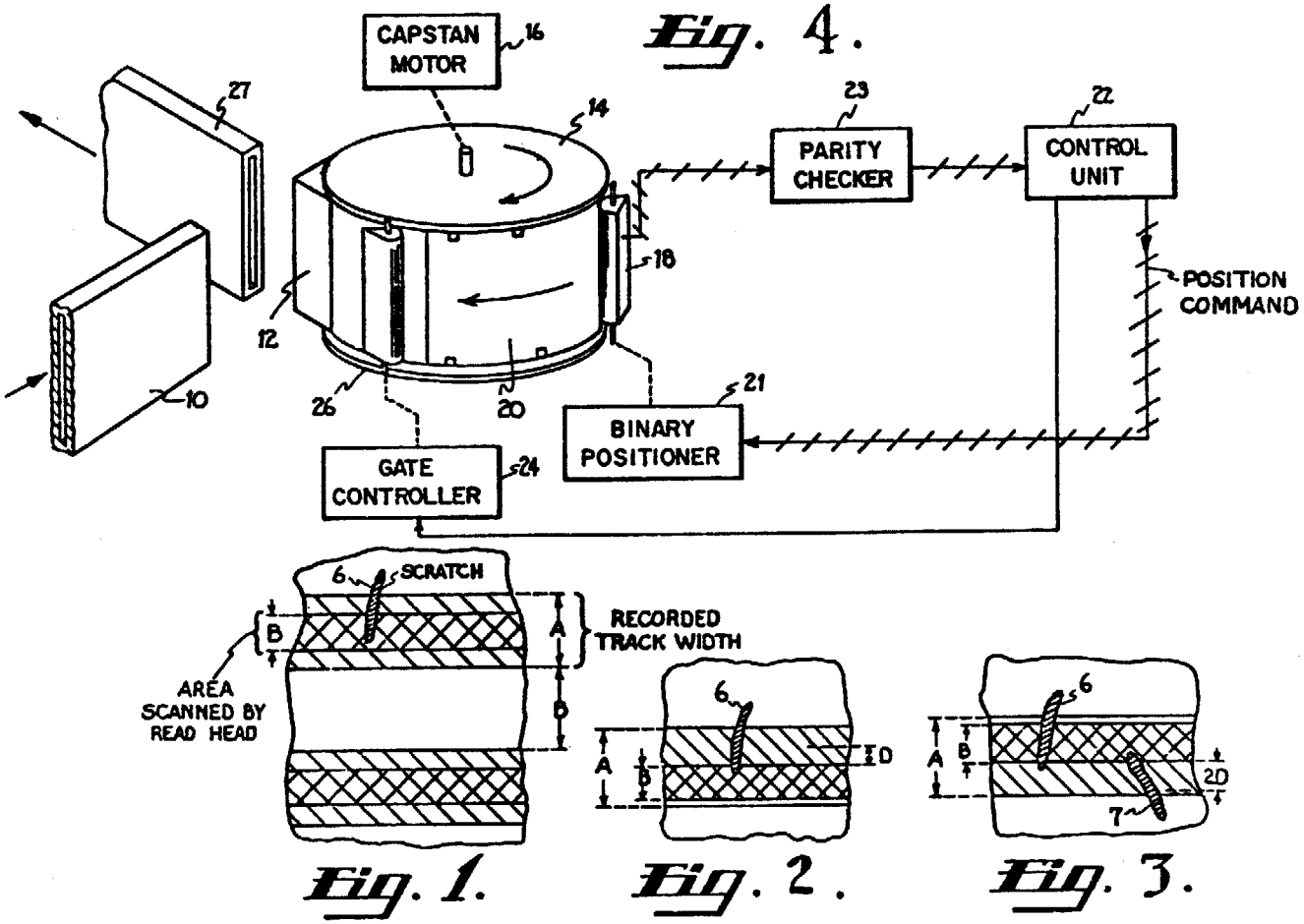
FIG. 1 is a schematic showing of two recording tracks on a portion of a recording medium.
FIGS. 2 and 3 are schematic showings of the method employed in the present invention for recovering normally illegible recorded information.
FIG. 4 is a block circuit diagram of a portion of a system which includes the arrangement of the invention.

A portion of a magnetic record medium is shown schematically in FIG. 1. Magnetic information is recorded on this medium along tracks of width A which are spaced from one another a distance C. Information may be read from the tracks by creating relative movement between the record medium and the read head in the track direction. As is well understood in this art, the width B of the area scanned by the read head is normally substantially smaller than the width A of the record track and occurs at the center of the record track. In one particular system, the various dimensions are A=0.022", B=0.012", C=0.003".

For any one of a number of reasons, it sometimes occurs that the record medium becomes damaged after the information is recorded thereon. A typical form of such damage consists of a scratch, such as shown at 6, which extends at an angle to the track direction. Such a scratch may obliterate one or more of the bits of recorded information and, of course, this results in reading errors.

The technique according to the present invention for recovering the otherwise illegible information such as described above is illustrated in FIGS. 2 and 3. First, the read head is moved a distance D to one edge of the recorded track and then relative movement is created between the read head and the record medium in the track direction. If the scratch is positioned such as shown in FIG. 2, it now extends only a relatively small distance into the area scanned by the read head and does not seriously affect much of the information recorded there. There is therefore a very good probability that the stored information now can be read.

If on the pass of the record medium relative to the read shown in FIG. 2 the stored information still cannot be read, the read head is moved a distance 2D in the opposite direction and the same procedure repeated. Now information which would otherwise be obliterated by a scratch such as 7 in FIG. 3 readily can be recovered. It has been found in one particular system that the technique of FIGS. 2 and 3 makes it possible to recover more than 90 percent of the read errors which occur.

A system in which the technique described above is particularly useful is a magnetic card, mass memory system such as the RCA 3488 memory system or the RCA Spectra 70/568 memory system shown in part in FIG. 4. In these systems, information is stored on plastic cards approximately 16" by 4½" which are coated with magnetic material. These cards are stored in magazines (not shown) and any card in any magazine may be randomly selected. One such selection scheme is discussed in U.S. Pat. No. 3,266,497 issued Aug. 16, 1966 to L. W. Bleiman. A card selected from a magazine passes into a track or raceway and is propelled by belts and rollers to the read/write station which is shown schematically in FIG. 4. Element 10 in FIG. 4 schematically represents the portion of the raceway immediately adjacent to the capstan 14. The card passes from the raceway portion 10 to the back surface of the generally triangularly shaped piece 12 and onto the capstan 14.

The capstan is continuously driven in the clockwise direction by capstan motor 16. A group of eight read heads and eight write heads are within the single structure 18 located adjacent to the capstan. They are capable of writing on and reading from eight interlaced tracks on the card 20.

The heads 18 are normally movable to one of sixteen different positions by the binary positioner 20. The latter may be of the hydraulically actuated type as, for example, is employed in the commercially available equipment referred to above or of the electromechanical type as shown in U.S. Pat. No. 3,266,329 issued Aug. 16, 1966 to H. M. Sellers et al., or in appl. Ser. No. 224,420, filed Sept. 18, 1962 and assigned to the same assignee as the present invention. To move to one of sixteen different positions, the positioner has four stages, each capable of moving the group of heads through a different distance, as discussed, for example, in the Sellers et al patent.

According to the present invention, the binary positioner has two additional stages, one capable of moving the heads a distance D equal, in one practical form of the invention, to approximately 5 mils (0.005 inches) and the other capable of moving the heads a distance equal to approximately 2D or 10 mils. The reason for these additional stages is to move the heads to the positions such that the read heads follow the areas of width B shown in FIGS. 2 and 3.

In the operation of the system of FIG. 4, an instruction stored in the memory (not shown) of a data processing machine (not shown) may call for the selection of a particular card and for reading information from a group of tracks thereon. Upon receipt of such an instruction, the control unit 22, at an appropriate time, causes the card called for to be selected from a magazine and to be propelled to the capstan 14. Concurrently, the control unit applies a position command, consisting of a binary word, to the binary positioner 21 and the latter moves the heads 18 to a position that they access the tracks called for by the instruction.

When the leading edge of the tracks on card 20 reaches the read heads, they begin reading the information on a group of 8 tracks. The parity checker 24 checks this information for correct parity and applies it to the main memory (not shown) of the data processing machine (not shown) associated with the mass memory.

After a card has been read, the instruction may call for it to be returned to the magazine from which it was extracted. In such case, the gate controller 24 moves the gate 26 to a position such that the card moves over the near edge of the triangularly shaped piece 12 to the exit passageway 27. Alternatively, the instruction may call for the card again to be circulated on the capstan and the information read from another group of tracks on the card. In this case, the gate controller 24 maintains the gate 26 in position such that the card passes between the generally triangularly shaped piece 12 and the capstan. At the same time, a new position command is fed to the binary positioner 21 to move the heads to a new position corresponding to that of the new tracks it is desired to read.

In accordance with the present invention, when parity checker 23 indicates an error in the information being read from one or more of the eight tracks concurrently being read, it applies an error signal to the control unit. The latter, in response to this signal, applies a new position command to the binary positioner to cause it to move the heads a distance D in one direction. As mentioned above, this distance is one such as shown in FIG. 2 which causes the read heads to scan an edge portion of all eight tracks one or more of which contain an error or errors. At the same time, the gate controller 24 maintains the gate 26 in a position such that the card remains on the capstan for at least a second pass. If during this second pass the error or errors previously found are corrected, then the next step in the instruction such as to return the cards to the magazine may be followed, just as in the case already discussed. On the other hand, if a parity error is still present, control unit 22 applies another position command to the binary positioner to cause it to move the heads 18 a distance 2D in the opposite direction. This causes the read heads to follow the path illustrated in FIG. 3. At the same time, the controller 24 positions the gate 26 so that the card 20 remains on the capstan for a third pass.

Employing the technique described above, there is a very high probability that the so called "drop out" errors, that is, the bits obliterated by damage to the recording medium, will be recovered. However, if after this procedure the error is still not recovered, the parity checker 23 so indicates to the control unit 22 and the latter actuates an alarm circuit (not shown) to indicate that there is a non-recoverable, drop out error.

While for purpose of ease of illustration, the system of FIG. 4 is shown to employ the gate structure 26, it may instead employ the new and improved card guiding structure described in U.S. Pat. No. 3,329,424 issued July 4, 1967 to J. W. Rabek. This patent also shows some of the details of the means for keeping the card on the capstan during the rotation thereof. It is also to be understood while the data recovery technique of the present invention is discussed in terms of a magnetic card system, it is applicable to magnetic tape and to other types of magnetic memory systems.

In the particular system described when an error is detected, the transverse movement between the tracks and read heads is accomplished by moving the heads until they are positioned close to one edge of the track. In other systems, it may be more practical to maintain the head or heads stationary and to move the record medium transversely thereto instead. The claims are intended to be generic to both forms of relative movement.

What is claimed is:

[1. In a system for reading a relatively wide record track on a record medium with a relatively narrow read head located at the approximate center of the track by creating relative movement between the record medium and head, in the track direction, in combination:

error detection means responsive to the information read by the read head for detecting an error; and means responsive to an error detected by the error detection means for creating relative movement between the read head and track in a direction transverse to the track, and in an amount such that the head is still over the same track, but relatively closer to an edge portion thereof than the head was in its original position, and for again creating relative movement between at least the portion of the record medium containing the error and the head, in the track direction.]

[2. In a system as set forth in claim 1, further including means responsive to an error still present for creating relative movement between the read head and track in a direction transverse to the track and in an amount and direction such that the head is still over the same track, but relatively closer to the other edge portion thereof than the head was in its original position, and for a third time creating relative movement between at least the portion of the record medium containing the error and the head, in the track direction.]

3. In a system as set forth in claim [2] *8*, said record medium comprising a plastic card formed with a magnetic recording surface.

[4. Apparatus for reading information from a record track of a kind susceptible to information damage extending part way across the track comprising, in combination:

a reading head located adjacent to and between the edges of said track for reading along an area of the track of width relatively narrower than the track width;

means for creating relative movement in the track direction between the track and head to permit said head to read said relatively narrow area of said track; and means responsive to detection of an error due to said damage in the information read from said relatively narrow area by said head for causing at least the error containing section of the length of the track to be re-read along a second relatively narrow area still over the same track but laterally shifted in the track relative to the first read area.]

[5. In a system for reading by means of a head along the length of a track on a record medium by creating relative movement between the medium and the head, at least a portion of said head being positioned in signal reading relationship over at least a portion of the width of said track;

an error detection means responsive to a signal read from said track by said head for detecting an error; and means responsive to said detected error for creating lateral relative movement between said head and said track such that said head is in a signal reading relationship over a different portion of the wdith of said track as compared to the original position of said head, and for causing said head to again read said track where said signal was originally read but with said head over said different portion of the width of said track.]

[6. In a system as set forth in claim 5, further including means responsive to an error detected by the error detection means for again creating lateral relative movement between said head and track in a direction opposite the direction of the first mentioned lateral move such that said head is over a different portion of the width of said track than was the head in its original position and its position after the first mentioned lateral move, and for causing said head to again read said track where said signal was originally read but with said head in a new lateral position relative to said track resulting from the second mentioned lateral move.]

7. In a system as set forth in claim [6] 9, said record medium comprising a substantially flat member formed with a magnetic recording surface.

*8. In a system for reading a relatively wide record track on a record medium with a relatively narrow read head located at the approximate center of the track by creating relative movement between the record medium and head, in the track direction, in combination:*

*error detection means responsive to the information read by the read head for detecting an error;*

*means responsive to an error detected by the error detection means for creating relative movement between the read head and track in a direction transverse to the track, and in an amount such that the head is still over the same track, but relatively closer to an edge portion thereof than the head was in its original position, and for again creating relative movement between at least the portion of the record medium containing the error and the head, in the track direction; and*

*means responsive to an error still present for creating relative movement between the read head and track in a direction transverse to the track and in an amount and direction such that the head is still over the same track, but relatively closer to the other edge portion thereof than the head was in its original position, and for a third time creating relative movement between at least the portion of the record medium containing the error and the head, in the track direction.*

*9. In a system for reading by means of a head along the length of a track on a record medium by creating relative movement between the medium and the head, at least a portion of said head being positioned in signal reading relationship over at least a portion of the width of said track;*

*an error detection means responsive to a signal read from said track by said head for detecting an error;*

*means responsive to said detected error for creating lateral relative movement between said head and said track such that said head is in a signal reading relationship over a different portion of the width of said track as compared to the original position of said head, and for causing said head to again read said track where said signal was originally read but with said head over said different portion of the width of said track; and*

*further including means responsive to an error detected by the error detection means for again creating lateral relative movement between said head and track in a direction opposite the direction of the first mentioned lateral move such that said head is over a different portion of the width of said track than was the head in its original position and its position after the first mentioned lateral move, and for causing said head to again read said track where said signal was originally read but with said head in a new lateral position relative to said track resulting from the second mentioned lateral move.*

* * * * *